Figure 1:
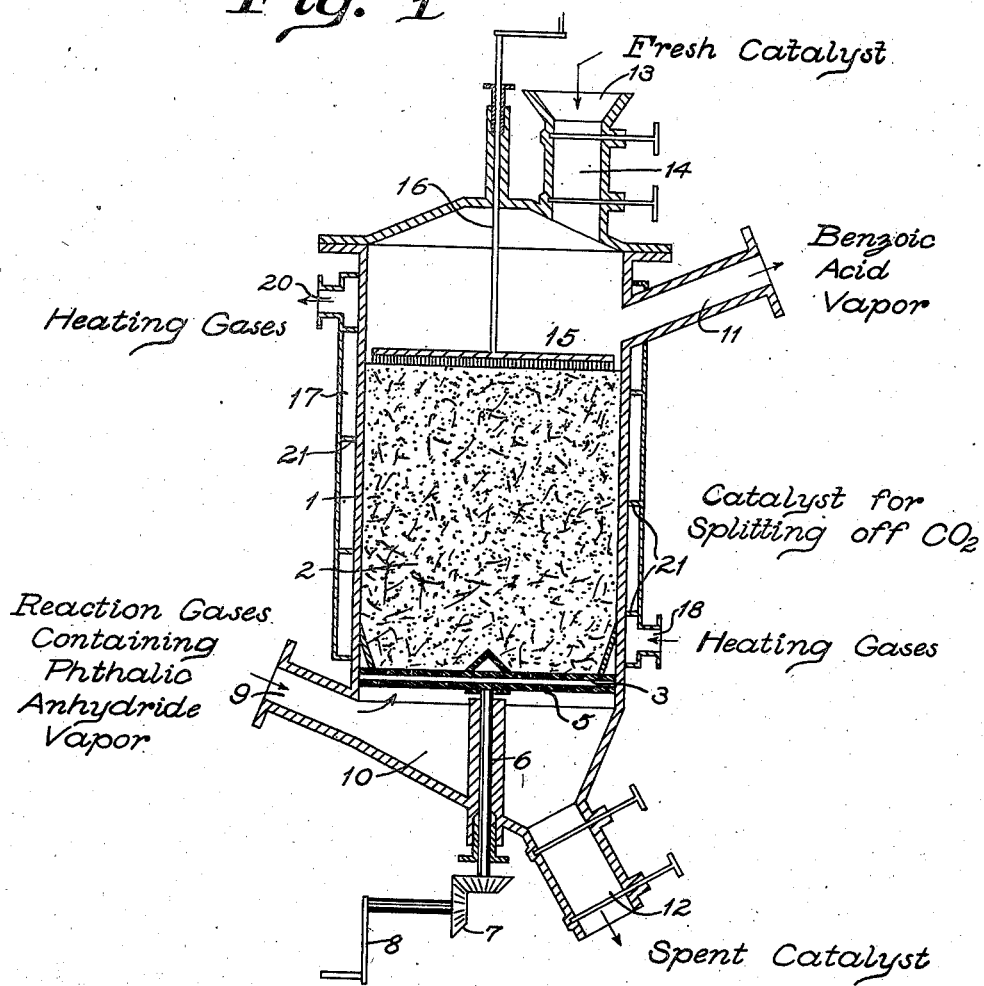

Aug. 3, 1937.  M. SCHARFF ET AL  2,088,929
APPARATUS FOR THE PRODUCTION OF PHTHALIC ANHYDRIDE AND BENZOIC ACID
Original Filed Aug. 14, 1929  2 Sheets-Sheet 1

Max Scharff
Johannes Brode, deceased
by Käthe Brode
administratix
Adolf Johannsen
Josef Reichart
INVENTORS

BY
ATTORNEY

Aug. 3, 1937.   M. SCHARFF ET AL   2,088,929
APPARATUS FOR THE PRODUCTION OF PHTHALIC ANHYDRIDE AND BENZOIC ACID
Original Filed Aug. 14, 1929   2 Sheets-Sheet 2

Max Scharff
Johannes Brode, deceased
by Kathe Brode
administratix
Adolf Johannsen
Josef Reichart
INVENTORS

BY
ATTORNEY

Patented Aug. 3, 1937

2,088,929

UNITED STATES PATENT OFFICE 2,088,929

APPARATUS FOR THE PRODUCTION OF PHTHALIC ANHYDRIDE AND BENZOIC ACID

Max Scharff, Heidelberg, Johannes Brode, deceased, late of Ludwigshafen-on-the-Rhine, by Käthe Brode, administratrix, Ludwigshafen-on-the-Rhine, and Adolf Johannsen and Josef Reichart, Ludwigshafen-on-the-Rhine, Germany, assignors to I. G. Farbenindustrie Aktiengesellschaft, Frankfort-on-the-Main, Germany Application November 9, 1933, Serial No. 697,302, which is a division of application August 14, 1929, Serial No. 385,859. Divided and this application June 14, 1935, Serial No. 26,530

1 Claim. (Cl. 23—288)

The present invention relates to the conversion of naphthalene into phthalic anhydride by catalytic oxidation and also to the conversion into benzoic acid of the phthalic anhydride thus obtained without an intermediary separation and is a division of the application Ser. No. 697,302, filed November 9th, 1933, which in turn is a division of our application Ser. No. 385,859, filed August 14th, 1929. More particularly the invention relates to apparatus for purifying the phthalic anhydride, thus rendering it possible to separate it in a pure state, which apparatus may also be used for the treatment of the phthalic anhydride vapors with a catalyst splitting off carbon dioxide, whereby the phthalic anhydride is converted into benzoic acid. Catalysts suitable for this conversion into benzoic acid are described and claimed in the application for patent by Johannes Brode and Adolf Johannsen, Ser. No. 149,520, filed November 19, 1926. The process for the purification of phthalic anhydride is generically described and claimed in the U. S. Patent No. 1,693,915, granted December 4th, 1928, to Johannes Brode and Adolf Johannsen. A specific method of making benzoic acid, in which the gas mixture containing phthalic anhydride is first passed over a purifying mass or over a catalyst for making benzoic acid, which is poisoned and thereby reduced in its acitivity, forms the subject-matter of the U. S. Patent No. 1,889,945, dated December 6th, 1932. The present invention chiefly relates to apparatus suitable for carrying out the processes of the aforesaid patents and application for patent.

We shall now describe our invention by reference to the production of benzoic acid from phthalic anhydride.

While the production of phthalic anhydride by the catalytic oxidation of naphthalene is a highly exothermic reaction, the conversion of the phthalic anhydride into benzoic acid proceeds with only a slight disengagement of heat. Since the gases leaving the oxidation catalyst are directly subjected to the treatment with the catalyst splitting off carbon dioxide, the phthalic anhydride is in a highly diluted state and the increase in temperature in this diluted condition is only about 20° C. when the reaction proceeds adiabatically. The most favorable temperature for the conversion into benzoic acid is slightly lower than that required for the catalytic oxidation of naphthalene and it is therefore possible to pass the gases leaving the oxidation catalyst with a temperature of about 400° C. over the catalyst capable of splitting off carbon dioxide directly or after slightly cooling them, which does not present any difficulties in practice. Means for controlling the temperature during the decarboxylation need not be provided, but the gases can be brought to reaction in a simple vessel filled with the catalyst, for example in an apparatus somewhat similar in appearance to a shaft furnace.

The conversion of the phthalic anhydride into benzoic acid is, however, attended with the difficulty that the catalysts are very liable to poisoning by sulphuric acid vapors which are formed in the oxidation by the combustion of organic impurities containing sulphur which are present in commercial naphthalene. As has been pointed out in the said U. S. Patent No. 1,889,945 this poisoning action of the gases is counteracted by first contacting the gases with a catalyst which has already been poisoned to some extent by sulphuric acid, but which is still capable of taking up considerable amounts of sulphuric acid, and only then contacting the gases with fresh catalyst. This process is preferably carried out by conducting the catalyst in a counter-current to the gases either continuously or periodically. In the same way highly active catalysts of high value can be protected by first passing the gases through masses which have a substantially lower catalytic activity and are much cheaper and which take up the sulphuric acid. Examples of such purifying masses are, for example, pumice granules, zeolites and the like. In such processes it is advantageous to pass at least the purifying masses in counter current to the gases and our invention relates more particularly to apparatus for conducting the catalyst or purifying masses in counter-current to the gases in a reliable manner.

Figure 2:
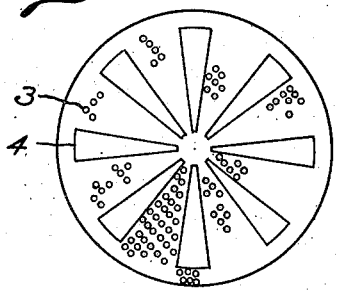
Figure 3:
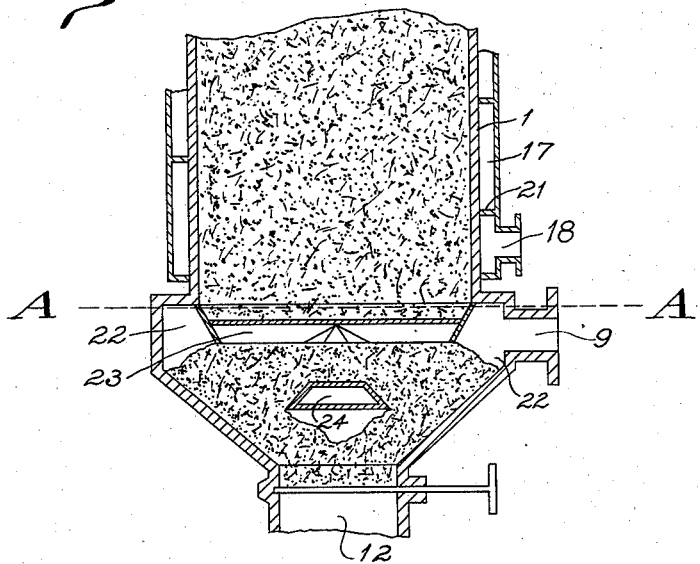
Figure 4:
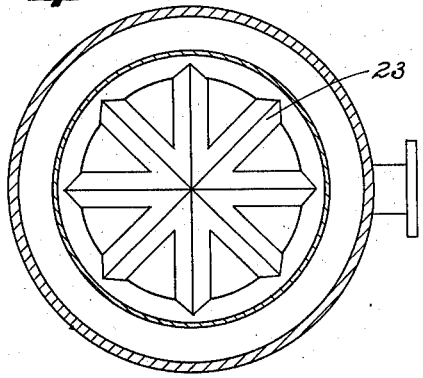

Our invention will be fully described with reference to the accompanying diagrammatical drawings which show some forms of apparatus suitable for carrying out our invention. In the said drawings Figure 1 represents a vertical section through one form of apparatus. Figure 2 represents a plan view of one structural element of the apparatus shown in Figure 1. Figure 3 illustrates a modified form of apparatus and Figure 4 is a cross-section on the line A—A, Figure 3.

Referring first to the modification shown in Figure 1, 1 is a cylindrical vessel which is filled with a catalyst 2. The catalyst is supported by a sieve-plate 3 which is shown in detail in Figure 2. As will be seen from said Figure 2, the said sieve-plate is provided with a number of large sector-shaped holes 4. Below the said sieve-plate 3 there is rotatably arranged a similar sieve-plate 5 also provided with sector-shaped holes. The said sieve-plate 5 can be rotated around the axle 6 by means of the gear-wheels 7 and the handle 8. When the apparatus is in use the two sieve-plates 3 and 5 are usually so positioned that the sector-shaped holes of the one plate do not coincide with those of the other plate, that is the two plates form a substantially continuous sieve supporting the catalyst. The gases are admitted by a tube 9 and pass from the chamber 10 through the said sieves and through the catalyst. They are withdrawn from the upper part of the vessel 1 by a tube 11. When the catalyst is to be removed from above the sieves, the lower sieve 5 is turned so that the sector-shaped holes in the one of the plates coincide with those in the other and the catalyst particles fall down into the chamber 10 where they collect and from which they can be withdrawn by means of the sluice 12. Fresh catalyst is supplied into the reaction vessel by means of a hopper 13 and a sluice 14. In order to impart the layer of catalyst a uniform level within the vessel 1, a steel-brush 15 is arranged therein which can be rotated around the axle 16. Preferably the sluice 14 is provided with an electric heating device which is not shown in the drawings and by which the fresh catalyst is heated so far as to avoid condensation of phthalic anhydride or benzoic acid on its surface. It will be seen that in the said construction the used catalyst, which is poisoned to some extent by sulphuric acid vapors, is always maintained in the lower portion of the vessel 1 and is brought into contact with the gases first. Only the purified gases come into contact with the fresh catalyst present in the upper part of the vessel 1. The said vessel 1 is surrounded by a chamber 17 which serves for heating the vessel and catalyst when putting the apparatus into operation. A heating medium, for example hot combustion gases or heated air can be admitted into said chamber 17 by means of the tube 18 and withdrawn therefrom by the tube 20. The said chamber 17 is provided with a spiral-shaped partition 21, whereby the heating gas is compelled to travel a screw-shaped path.

It will be understood without further explanation that the apparatus described may be modified in a great variety of ways without departing from the scope of our invention. For example, the sieve-plates 3 and 5 may be provided with openings of another shape than that of a sector, for example, they may have a circular or elliptical shape. Further the lower plate 5 need not be rotated, but the large holes in the two sieve-plates may also be brought to coincide by moving the plate 5 in a linear direction.

Sieve-plate systems constructed similar to a Venetian blind may also be used.

Referring to Figures 3 and 4, Figure 3 illustrates a vertical section through the lower part of an apparatus which in its upper part is similar to that described in Figure 1. Corresponding parts of the apparatus shown in Figures 1 and 3 are indicated by the same reference numbers. In the device shown in Figure 3 the reaction gases are admitted by the tube 9 and are divided throughout the catalyst by means of the annular chamber 22 which is free from catalyst and from which they are admitted to below a number of inverted V-shaped metal bars 23 which serve for dividing them throughout the catalyst. The said metal bars are arranged so that holes of substantial width are formed between them, which holes permit spent catalyst to pass through. For example, the bars may be arranged radially in the reaction vessel. The spent catalyst is withdrawn by means of the sluice 12, similar to the arrangement shown in Figure 1. In order to prevent the catalyst in the vessel 1 from falling more rapidly in the center of the vessel than it does near the outside thereof, we prefer to arrange in the lower part of the vessel a stopping device 24 which may be made of sheet-metal, for example, and offers a certain resistance to the downwardly directed flow of catalyst in the center of the vessel.

It may be noted here that all apparatus described in the foregoing are provided with a heat insulation in order to prevent losses of heat. This insulation is not shown in the drawings for the sake of greater clearness. Also the apparatus are provided with means for controlling the temperature which are also not shown in the drawings. In the same way as hereinbefore described for the production of benzoic acid, the apparatus may be used for the purification of phthalic anhydride by contact with solid masses absorbing sulphur compounds, as for example pumice stone, silica gel, zeolites, bauxite and the like. In such case the gases leaving the oxidation catalyst are cooled before entering the purification apparatus so far that no catalytic action of the purifying masses takes place. In this connection it may be pointed out that the said purifying masses possess to a small extent the property of splitting off carbon dioxide and of producing benzoic acid when used at high temperatures. Further the power of the said masses of absorbing sulphuric acid is higher at lower temperatures. However, the temperatures should not be so low that separation of the phthalic anhydride vapors contained in the gases takes place and the most suitable temperature is therefore about 200° C. By the separation of the sulphuric acid the formation of dark colored condensation products of alpha-naphthoquinone during the separation of the phthalic anhydride is prevented. The small amounts of alpha-naphthoquinone present in the gases are separated only on extensive cooling together with the last traces of phthalic anhydride, whereas the bulk of the latter is separated as a pure white crystalline mass of powder of excellent purity.

What we claim is:

Apparatus suitable for producing benzoic acid from phthalic anhydride and for purifying phthalic anhydride produced by the catalytic oxidation of naphthalene, which comprises a vessel, a pair of substantially horizontal adjacent plates in said vessel, said plates having a plurality of holes sufficiently small to prevent the free passage of solid material and each having at least one hole sufficiently large to permit said solid material to pass therethrough, the upper of said plates being fixed in said vessel and the lower being rotatable in a plane parallel to the upper plate, the said large holes being substantially smaller than said plates and so arranged that, when the lower plate is rotated, they alternately open and close a continuous passage through the pair of plates, a gas inlet below said plates, a gas outlet at the top of said vessel, and a sluice permitting the passage of said solid material each in the upper and in the lower part of said vessel.

MAX SCHARFF.
KÄTHE BRODE,
*Administratrix of Johannes Brode, Deceased.*
ADOLF JOHANNSEN.
JOSEF REICHART.